CAPACITY TABLES (FREQUENCY VARIATION 300-480Hz)

| System | STAGE | CUT-IN POINT F° | VALVE OR SHUTTER POSITION | UNIT 2 HORSEPOWER | UNIT 2 CURRENT (AMPS) | UNIT 2 AVERAGE FREQUENCY | UNIT 3 HORSEPOWER | UNIT 3 CURRENT (AMPS) | UNIT 3 AVERAGE FREQUENCY | TOTAL MACHINE CAPACITY | NOMINAL CURRENT |
|---|---|---|---|---|---|---|---|---|---|---|---|
| AIR TO AIR HEAT/COOL SYSTEM (OUTSIDE CONTROLLER) | S1 | 10 | HEAT | 10 | 35 | 480Hz | 10 | 35 | 480Hz | 100% | 70 AMPS |
| | S2 | 20 | HEAT | 7 | 24.5 | 420Hz | 7 | 24.5 | 420Hz | 70% | 49 AMPS |
| | S3 | 40 | HEAT | 4 | 14 | 360Hz | 4 | 14 | 360Hz | 40% | 28 AMPS |
| | S4 | 73 | HEAT | 4 | 14 | 360Hz | OFF | — | — | 20% | 14 AMPS |
| | S5 | 73 | COOL | 4 | 14 | 360Hz | OFF | — | — | 20% | 14 AMPS |
| | S6 | 100 | COOL | 4 | 14 | 360Hz | 4 | 14 | 360Hz | 40% | 28 AMPS |
| | S7 | 120 | COOL | 7 | 24.5 | 420Hz | 7 | 24.5 | 420Hz | 70% | 49 AMPS |
| | S8 | 130 | COOL | 10 | 35 | 480Hz | 10 | 35 | 480Hz | 100% | 70 AMPS |
| POSSIBLE ADDITIONAL STAGES — AIR TO AIR HEAT/COOL SYSTEM (INSIDE CONTROLLER) | S1(A) | 71.5 | HEAT | 10 | 35 | 480Hz | 10 | 35 | 480Hz | 100% | 70 AMPS |
| | S2(A) | 72 | HEAT | 7 | 24.5 | 420Hz | 7 | 24.5 | 420Hz | 70% | 49 AMPS |
| | S3(A) | 72.5 | HEAT | 4 | 14 | 360Hz | 4 | 14 | 360Hz | 40% | 28 AMPS |
| | S4(A) | 73 | HEAT | 2 | 7 | 300Hz | OFF | — | — | 10% | 7 AMPS |
| | S5(A) | NULL STAGE | — | — | — | — | — | — | — | — | — |
| | S6(A) | 73.5 | COOL | 2 | 7 | 300Hz | OFF | — | — | 10% | 7 AMPS |
| | S7(A) | 74 | COOL | 4 | 14 | 360Hz | OFF | — | — | 20% | 14 AMPS |
| WATER TO WATER HEAT/COOL SYSTEM (AQUASTAT CONTROLLER) | S1(B) | 150 | HEAT | 10 | 35 | 480Hz | 10 | 35 | 480Hz | 100% | 70 AMPS |
| | S2(B) | 152 | HEAT | 7 | 24.5 | 420Hz | 7 | 24.5 | 420Hz | 70% | 49 AMPS |
| | S3(B) | 154 | HEAT | 4 | 14 | 360Hz | 4 | 14 | 360Hz | 40% | 28 AMPS |
| | S4(B) | 156 | HEAT | 2 | 7 | 300Hz | OFF | — | — | 10% | 7 AMPS |
| | S5(B) | 40 | COOL | 2 | 7 | 300Hz | OFF | — | — | 10% | 7 AMPS |
| | S6(B) | 42 | COOL | 4 | 14 | 360Hz | 4 | 14 | 360Hz | 40% | 28 AMPS |
| "COOLING ONLY" SYSTEM | S9 | 73 | — | 1 | 5 | 280Hz | — | — | — | 10% | 5 AMPS |
| | S10 | 73.5 | — | 3 | 11 | 350Hz | — | — | — | 30% | 11 AMPS |
| | S11 | 74 | — | 6 | 21 | 400Hz | — | — | — | 60% | 21 AMPS |
| | S12 | 74.5 | — | 10 | 35 | 480Hz | — | — | — | 100% | 35 AMPS |

FIG.5

HEATING

COOLING

United States Patent Office 3,447,335
Patented June 3, 1969

3,447,335
VARIABLE CAPACITY CENTRIFUGAL HEAT PUMP
John D. Ruff, 206 Birch St., and Phillip R. Wheeler, 209 W. Pine St., both of Alexandria, Va. 22305
Filed Sept. 22, 1967, Ser. No. 676,368
Int. Cl. F25b 29/00, 41/00, 1/10
U.S. Cl. 62—159                                17 Claims

ABSTRACT OF THE DISCLOSURE

This invention is an electrically powered air conditioning and heat pump system using small centrifugal compressors. Stability in operation over a wide range of operating conditions is accomplished by modulating system capacity by compressor speed control. A feed back of compressor motor current level provides the basis of this control.

---

This invention introduces some variations and improvements on our pending patent "Residential Heat Pump with Centrifugal Compressor and Wide Range of Capacity Variation," filed on Feb. 1, 1967, Ser. No. 613,271. This present invention is a comparatively simpler machine with fewer component parts and producible at lower cost.

The object of this invention is to produce a heat-pump/air-conditioner of suitable capacity for an average size dwelling, or small commercial installation, having a large capacity for heating by the highly efficient heat pump method, yet still being efficient at the lower capacity needed for cooling operation. An examination of heating/cooling load requirements in most parts of the United States shows that an average size dwelling can be cooled satisfactorily with a 3 HP system but that at 10° F. a heat pump would need to have a capacity of 15 HP to heat the same dwelling.

Current practice with residential heat pump applications would be to use a 5 HP unit for the above mentioned dwelling; which would be more than adequate for cooling purposes, but would only be suitable for heating at temperatures of 40° F. or more. At temperature lower than this the heat pump would cease to function and heating would be provided by electrical resistance elements which are about 250% more costly to operate. This type of system is very suitable in temperate regions where the temperatures do not go below 40° F. very often or for very long periods. However, in the colder regions this type of system has been found to be generally unsatisfactory. And, if a larger compressor of the conventional reciprocating type be used for the heat pump, it is found to be quite cumbersome and costly and inclined to have lubrication problems, poor volumetric efficiency, and unsatisfactory mechanical reliability as compared to the superior performance of a centrifugal compressor, when used at low outside temperatures.

Conventional centrifugal compressors are generally quite expensive and not smaller than 50 HP but this invention uses a high frequency electrical supply to the motor so that the impeller speed can be increased and the impeller diameter reduced and then a smaller and relatively simpler compressor of about 20 HP can be produced at reasonable cost, while still retaining the advantages of high efficiency and superior reliability associated with this type of compressor.

Our earlier invention (Ser. No. 613,271) was similar, but the main difference in the present invention is that the servo-operated changeover valves in the refrigerant circuit are eliminated and the evaporator and condensor do not reverse their function when the machine changes between heating and cooling operation. That is, the evaporator remains the evaporator in both heating and cooling operation, and the condenser or heating coil remains the system condenser in both heating and cooling. Changeover is achieved by a reversal of the inside and outside air circuits, by means of a changeover air shutter system. That is, in heating operation, the inside or room air is circulated over the condenser coil and the outside air over the evaporator. Then on changeover to cooling, the shutters reverse the circuits and the inside air is circulated over the evaporator and the outside air over the condenser (see FIGS. 6, 7, 8).

This present invention has some changes in the system of control of the compressor speeds.

This present invention is primarily shown as an air to air system and cannot be used as an air to water system in the manner of our earlier invention. However it can be used as a water to water system, with some changes, as is also shown.

In the present invention the maximum cooling capacity of the machine can be equal to maximum heating capacity, whereas in our previous invention, the cooling capacity is considerably less than the heating capacity. However, efficient capacity variation over a wide range, can still be achieved in both heating and cooling.

This invention comprises:

A heat pump/air conditioner using centrifugal compressors.

A compressor system using two, two stage centrifugal semihermetic units, each unit being driven by a variable speed, high speed induction motor, so that the capacity of the system can be variable over a wide range.

An alternative compressor system using a single two stage unit.

Methods of capacity control so that the appropriate system capacity is automatically selected.

A means of limiting the electrical current drawn from the supply circuit during start up of the motors.

A system of changeover shutters which change the function of the machine between heating and cooling by reversing the circuits of the inside or room air and the outside air.

A method of arranging the compressor units so that the refrigerant vapor cools the windings of both motors in the same sweep, so that the pressures around all the motor shaft bearings and throughout the lubrication system are essentially the same.

A system of lubrication for the motor shaft bearings.

A system of recovering oil absorbed into the refrigerant.

A method of controlling the capacity of the evaporator by reducing the quantity of liquid maintained in it.

In the drawings:

FIG. 5 is a table of compressor capacities.

*Compressor (four stage)*

A four-stage compressor system is used in this invention and provision made for shutting down two stages when a lower compression ratio is needed. A checkvalve 1 (see FIG. 1) provides a bypass for the refrigerant vapor when these stages are shut down. The compressor stages (FIG. 1) are constructed in two separate units 2 and 3. These units are mounted in two interconnected semihermetic enclosures 4 and 5. However a possible alternative method of construction might be to mount both these units in a single enclosure. Each of the units, contains a central squirrel-cage motor with a centrifugal stage at each end of its shaft. An additional means of adjusting the capacity of the system is to change the frequency of the electrical supply to the motors. A typical range of operating capacities of the system is from 4 HP with two stages of compression (at reduced speed), to 20 HP with four stages of compression (at full speed).

Compressor (two stage)

Figure 2:
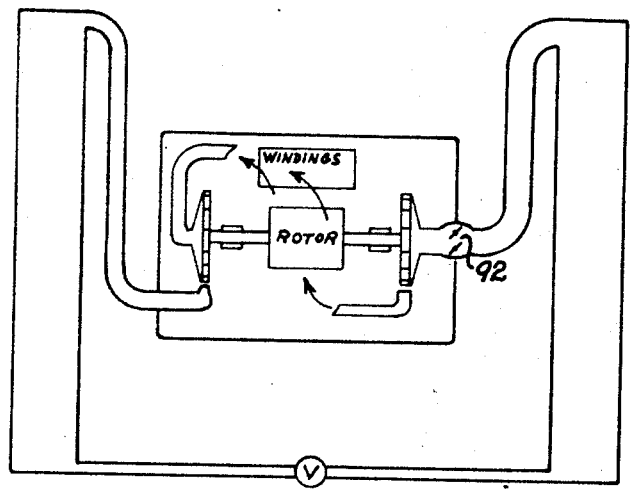
FIG. 2 is a schematic diagram showing a system with a single two stage compressor.

An alternative compressor system using a single two stage unit is shown in FIG. 2. This arrangement is much simpler and would be quite adequate in the milder Southern areas where the outside temperature does not get too low. In this case the higher compression ratio of the four stage system is not needed.

Frequency converter

Figure 3:
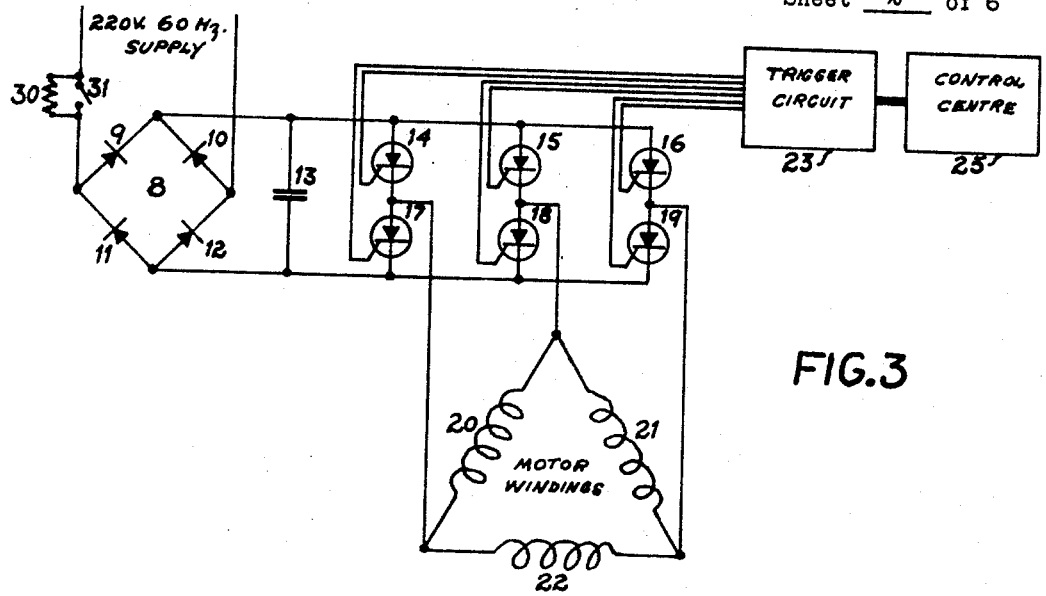
FIG. 3 is a simplified wiring diagram of a suitable frequency converter.

FIG. 3 illustrates, in simple form, a high frequency converter of typical specifications for supplying power to the compressor motors. There is a converter (6 and 7 in FIG. 1) for each motor. The 220 v. A.C., 60 Hertz (cycles per second), single phase supply (see FIG. 3) is first rectified by the bridge rectifier 8 using solid state diodes 9, 10, 11, 12. This pulsating D.C. output is smoothed by filter capacitor 13 and fed to the silicon controlled rectifiers 14, 15, 16, 17, 18, 19 which switch into the three phase motor windings 20, 21, 22 of one of the motors. Some filtering may be necessary at the windings to achieve optimum wave shape and can be provided as needed. The firing of the silicon controlled rectifiers 14, 15, 16, 17, 18, 19 is controlled by the variable frequency phase sequencer (or trigger circuit) 23. There is only one such sequencer and it controls both converters. This circuit triggers and turns off the silicon controlled rectifiers in the necessary sequence for a three phase operation. The frequency of the resulting three phase supply is variable by changing the frequency of the sequencer oscillations.

By this method the speeds of rotation of the compressor motors of units 2 and 3 are controlled since these motors are of the squirrel cage induction type and their speed is dependent on their supply frequency. Since the capacity of a centrifugal compressor varies basically as the cube of the rotation speed, then the operating capacity of each compressor unit will be approximately reduced to 40% of full capacity by a 25% drop in the rotation speed. This would be a typical range of capacity variation, with a span of about 40° F. in evaporator temperature (0° F.–40° F.). "Capacity" in this case refers to the work done by the compressor as expressed in horsepower. Actually this capacity is dependent very largely, on the pressure against which the compressor is working (or the compression ratio between the condenser and evaporator pressures.

There are several methods of achieving the frequency conversion to control motor speed but an electronic converter as described above is preferred since the necessary frequency changes can be accomplished simply by changing the frequency in the trigger circuit. Details of such a circuit are not shown for the sake of simplicity but such circuits are often used in three phase converters and inverters. Although a variable frequency trigger circuit is less common, such variations can readily be obtained by varying certain voltages or currents in the circuit controlling the trigger frequency. However, a motor/generator set or any other type of variable frequency converter can be used as an alternative conversion method.

When operating the machine from a three phase power source the bridge rectifier 8 would, of course, not be used, but a three phase rectifier system substituted.

Automatic capacity control

The various capacity requirements of the overall system are dependent mainly on outside air temperature. The horsepower requirements of the system (in heating function) are compounded as outside temperature drops. First the heat loss of the dwelling becomes greater due to the increased difference between inside and outside temperatures. This calls for a higher heat output from the system. However the heat source sink (outside air) temperature is also lowered and so additional horsepower is required to compress the refrigerant over a higher compression ratio.

Figure 1:
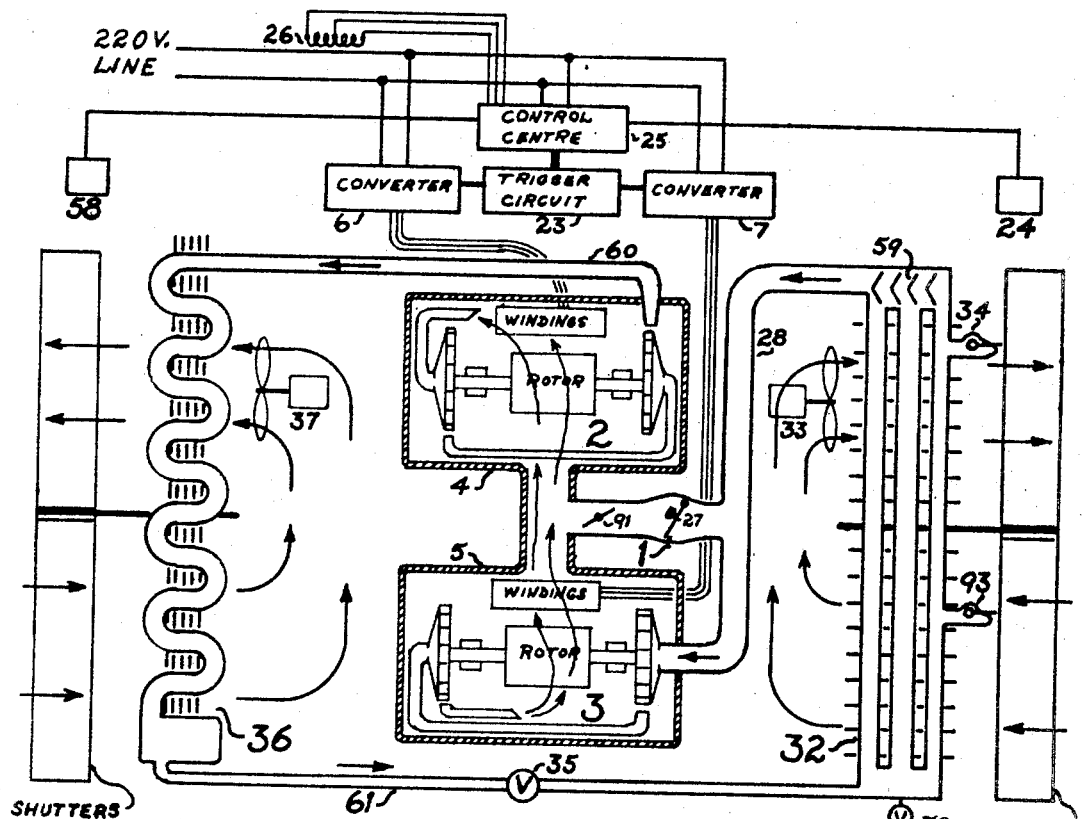
FIG. 1 is a schematic diagram showing general system operation.

For automatic selection of the appropriate stage of system capacity, mainly in heating operation, a multistage capacity controller 24 (see FIG. 4) is placed in the outside air with the switch points of this controller being part of the control centre 25 circuits (see FIGS. 1 and 3). The control centre 25 is a grouping of control components and circuits. Included here are the capacity and change-over controller and associated circuits, thermostats circuits, defrost control, oil recovery controls, controlled starting current circuits and all other general control circuits.

The controller 24 has five steps (but there could be more or less depending on operating requirements). The four steps S1, S2, S3, S4 are the various stages of heating capacity as shown in FIG. 5. These stages are automatically selected on rise and fall of outside temperature. Each stage, when selected, calls for a different preset horsepower from the motors. These horsepowers correspond to matching nominal currents in the supply to the converters (also shown in FIG. 5). These currents are detected at the input of the converters by detector 26 (see FIG. 1). This detector is a pick-up coil placed around or adjacent to one of the conductors supplying power to the motor converters. When a current flows in the conductor a voltage is induced in the pick up coil. This voltage is basically proportional to the strength of the current in the conductor.

The control system adjusts the frequency, of the supply to the motors, so that the nominal curent for the stage in use is maintained. For example, should the outside temperature rise a little, while the system was running (but not enough to engage another stage), then there would be a slight rise in evaporator pressure. This would cause an increase in vapor flow through the compressor, and an increase in motor current, making it greater than the nominal current. So the control system would slow the motors down to a speed at which the nominal current was maintained again. A drop in the temperature of the condenser would similarly cause the control system to slow the motors.

Another example would be, if the outside temperature should drop. There would be a drop in evaporator pressure. This would cause a decrease in the gas flow and a decrease in motor current so that it would be less than the nominal current. So the control system would speed up the motors to a speed at which the nominal current was maintained again. A rise in condenser temperature would similarly cause the control system to speed up the motors. In this way the motor current is stablized and held at the nominal current of the stage in use.

The current detection by detector 26 is a feed-back on motor performance, and its utilization is as a feed-back control of the trigger circuit frequency and thence the motor speed. This trigger frequency is a floating value, though of course it has high and low limits. At all times when the two motors are running together they are running at equal speeds.

At stage S4 the motor of the low pressure unit 3, is stopped. At this stage the extra compression ratio provided by the low pressure unit is not needed. The refrigerant vapor is then bypassed through checkvalve 1 (FIG. 1). Checkvalve 1 is normally held closed (by the weight of its flap 27). However when unit 3 is shut down the vapor in suction line 28 will travel to unit 2 by the path of least resistance. That is, through checkvalve 1 which is opened when the vapor pressure in line 28 overcomes the weight of flap 27.

The horsepowers, amperages, temperatures and frequencies shown in FIG. 5 are for comparison and illustration only and are not specific features of this invention. The cut-in points given are the points at which the stages will switch in, in heating function, on drop of outside temperature. The settings of these points could be adjustable.

Figure 4:
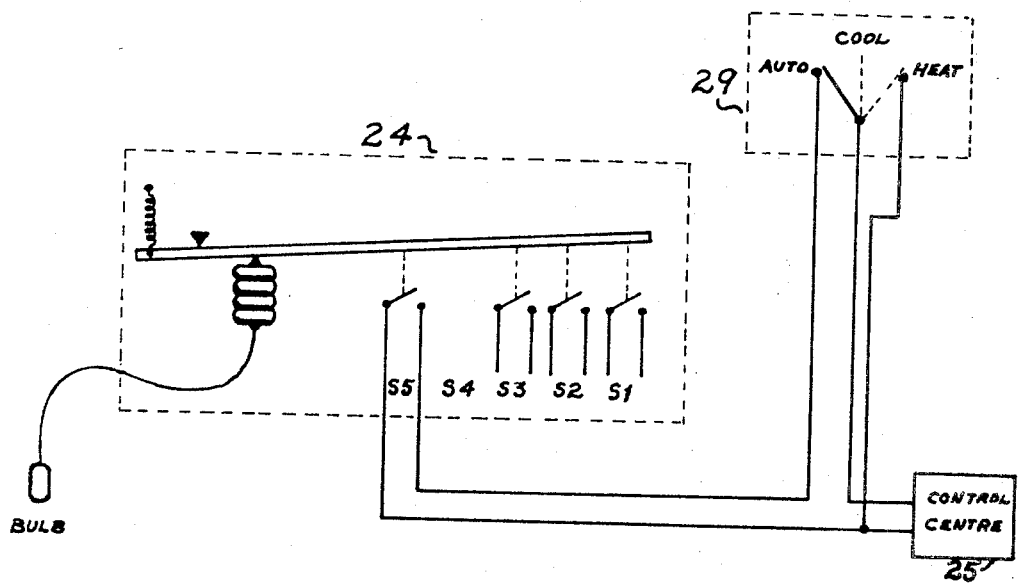
FIG. 4 is a schematic diagram showing a capacity controller.

In FIG. 4, no switch points are shown for S4 since all operation above S3 temperature will be at the same capacity with the only switching needed, being done by the S5 points for the automatic changeover between heating and cooling. This changeover occurs at about 73 degrees F. outside temperature, though this setting can vary with different applications. A manual changeover switch 29 (in FIG. 4) overrides the automatic changeover.

In stage S5 the compressor 2 is running at the same current as with S4 but in cooling function. (That is, the changeover shutters (FIGS. 6, 7, 8) would have reversed the air circuits over the evaporator and the condenser.)

In some cases, particularly with very high outside temperatures, it may be desirable to use extra stages of cooling capacity. This would be achieved by maintaining the heavier currents with both motors as with S3, S2, S1, but keeping the changeover shutters in the cooling positions (see stages S6, S7, S8 in FIG. 5). Control of these stages would be by extra stages in controller 24.

An alternative arrangement in the use of capacity controller 24 would be that it operates over a continuous range of nominal amperages rather than in steps S1, S2, S3, S4, etc. The changeover switching would of course still be necessary.

Controlled current motor starting

In this invention, precaution is taken to prevent high starting current through the compressor motors. This being particularly important since the present invention is designed primarily for residential use where the electrical supply often does not have high current capacity. Since a centrifugal compressor does not assume its load until it approaches its full speed, load torque at starting is not a problem. The only factor is the inertia of the rotor, shaft and impellers as they pick up speed, and the high current due to the large amount of field slip at the low speeds till full speed is reached. So a current limiting resistor 30 (FIG. 3), is switched into the converter circuit by opening switch 31 during starting. Switch 31 is controlled by a time delay switch and left open only long enough for the motor to pick up speed. During this time all current through the converter and motor circuit flows through resistor 30 so that if its resistance is about the same as the impedance of the inverter/motor circuit at full load, then the starting current cannot exceed the full load current, even at locked rotor conditions. Such limiting resistors are used in both motor circuits.

Evaporator

In this invention an air contacted, flooded evaporator 32 (see FIG. 1) is used. Air is pulled through the bottom half of the evaporator 32 by fan 33 and pushed out through the top half. A float switch 34 is placed at the operating level of the liquid refrigerant. This switch controls the refrigerant level by opening and closing liquid line solenoid 35.

Condenser

Condenser 36 (FIG. 1) is also air contacted, and similarly air flows in through the bottom half, and out through the top half, propelled by fan 37.

Changeover shutters

Figure 6:
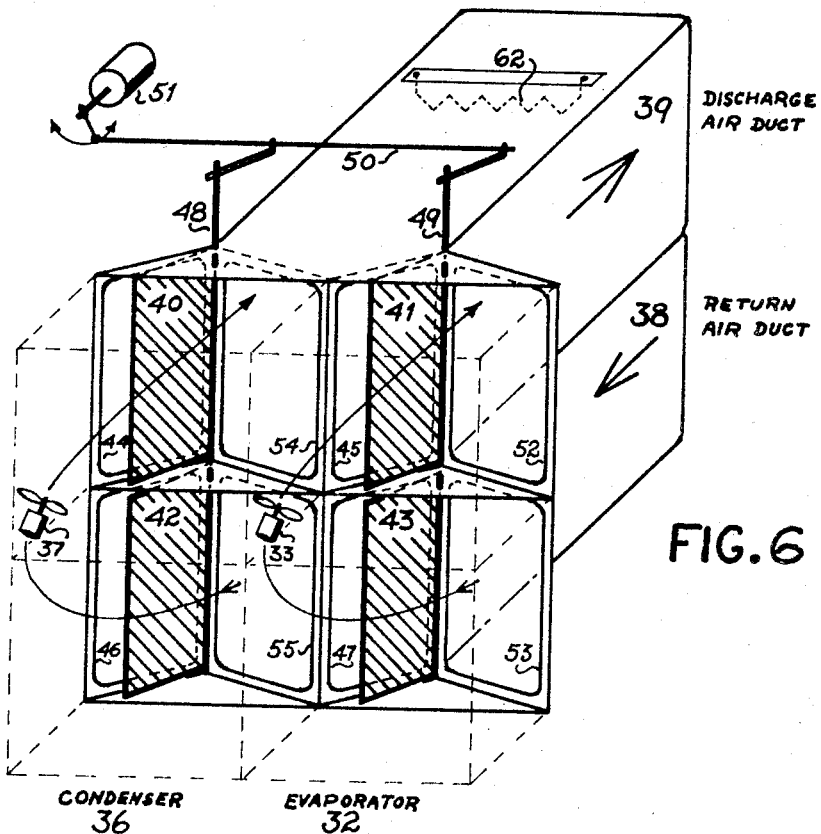
FIGS. 6, 7, 8 show an example of a changeover shutter system.
Figure 7:
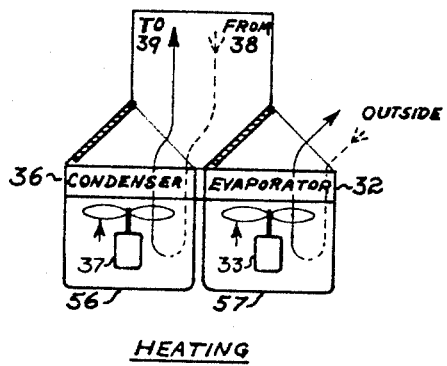
Figure 8:
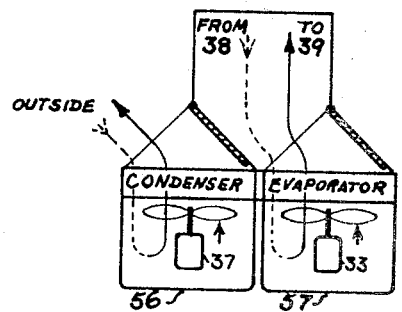

FIGURES 6, 7, 8 show a system of changeover shutters. In this example the complete machine is installed outside the dwelling with return air duct 38 and discharge air duct 39 connecting to inside the dwelling. Shutters 40, 41, 42, 43 are shown in a position near their seatings 44, 45, 46, 47 (in FIG. 6). Shutters 40 and 42 are mounted on shutter pivot shaft 48, and control condenser air. Shutters 41 and 43 are mounted on shutter pivot, shaft 49 and control evaporator air. Both pivot shafts are linked together by linkage 50 and the whole shutter assembly is activated by gearmotor 51. Shutter seating frames 44, 46, 52, 53 are open to the outside air. Shutter seating frames 45 and 54 are connected to discharge air duct 39, and frames 47 and 55 are connected to return air duct 38. Evaporator fan 33 pulls air through the bottom half of the evaporator 32 and pushes it through the top half. Condenser fan 37 pulls air through the bottom half of condenser coil 36 and pushes it through the top half.

The air flowing through fan 33 and the air flowing through fan 37 are kept separate from each other and outside air by suitable enclosures 56 and 57, which completely enclose the inside faces of evaporator 32 and condenser coil 36, as shown in FIGS. 7 and 8.

For the heating setting the gearmotor 51 pushes the linkage 50 which causes shutters 40, 41, 42, 43 to close on seatings 44, 45, 46, 47 leaving seating frames 52, 53, 54, 55 open. Then return air travels through frame 55, through the bottom half of condenser coil 36, through condenser fan 37, through the top half of condenser coil 36 through frame 54 and back along discharge air duct 39. Outside air passes through frame 53, through the bottom half of evaporator 32, through evaporator fan 33, through the top half of evaporator 32 and is discharged through frame 52 to the outside.

For the cooling setting the gearmotor pulls the linkage 50 which causes the shutters to close on seatings 52, 53, 54, 55 and opens frames 44, 45, 46, 47. Then return air from duct 38 travels through frame 47, through the bottom half of evaporator 32, through the evaporator fan, through the top half of the evaporator, through frame 45 and back along the discharge air duct 39. Outside air passes through frame 46, through the bottom half of condenser coil 36, through the condenser fan, through the top half of condenser coil, through frame 44 and back to the outside.

If the machine is to be installed inside the dwelling, ducts 38 and 39 could lead to the outside, frames 44 and 52 be connected to inside discharge air ducts, frames 46 and 53 used for return air, and the gearmotor hooked up for reverse action.

System operation (heating)

First an example is taken with an outside temperature of 8 degrees F. Since the bulb of controller 24 of FIG. 4 is colder than 73° F., then the stage S5 switch points will have the system switched to heat pump operation (refer to FIG. 5). That is, the changeover shutters will be in the heating position, and the inside thermostat 58, circuit (FIG. 1) will be switched to make on drop of temperature. Then on a drop in the temperature of thermostat 58, it will call for heat, and through the control centre the compressor motors will be started. The capacity controller 24 will cause both compressor motors to run at full current since at 8 degrees F. the system is in stage S1 capacity (refer to FIG. 5).

The refrigerant circuit (FIG. 1) is as follows: Evaporator 32 is a flooded evaporator and as the refrigerant is boiled off, the coil temperature becomes low, so that heat can be extracted from the outside air. On leaving the evaporator the refrigerant vapor is drawn through baffles 59, through suction line 28 and on into the inlet of the low temperature compressor unit 3 where it is compressed through two stages of compression and discharged into the inlet of the high temperature compressor unit 2.

Compressor unit 2 compresses the refrigerant through two more stages and delivers this hot gas through discharge line 60 and to the condenser coil 36 and the heat extracted from it provides the heat product to the air going through this coil. The condensed liquid, at head pressure, travels through the liquid line 61 to the liquid line solenoid valve 35. To maintain the liquid level in evaporator 32 as the refrigerant is boiled off, float switch 34 causes solenoid valve 35 to open and close as required. When it is open the liquid refrigerant is forced, at head pressure, along the liquid line and into evaporator 32. When the liquid level reaches float switch 34 the solenoid valve is turned off. This on-off cycling of valve 35 is continuous. Liquid line 61 has as small a diameter as is practicable. That is, it must be large enough to pass sufficient liquid at maximum system capacity, but not much larger. The flow of liquid into evaporator 32 should not be too rapid or agitation of the liquid mass would occur.

In stage S2 capacity (see FIG. 5) there is no change in the refrigerant circuit only a slow down of the compressor motors. In stage S3 capacity there is a further slow down. However in stage S4 the low temperature compressor unit 3 is stopped and the refrigerant vapor flows through bypass valve 1.

An electric resistance heating element 62 (see FIG. 6) is placed in the discharge air flow. This can be used as a standby heating method in case of system failure, as an additional source of heat at extremely low outside temperatures, and also as a part of the defrost system. Resistance element 62 can also serve a dual purpose and be used as the starting resistor 30 (FIG. 3). But with the four stage compressor system there are two starting resistors 30 so that when they are to be used in the function of heating element 62 they are switched into a parallel circuit and comprise a dual element heater.

The method of defrosting the evaporator, 32, during heat pump operation, is to stop the compressors and the condenser fan and then actuate the changeover shutters. The warm inside air is then drawn over the evaporator and melts the frost. This causes a cooling of the discharge air, so while defrost is in progress the resistance heating element 62 should be used to neutralize the cooling effect.

System operation (cooling)

As stage S5 of the multistage controller 24 is reached, at about 73° F., the system is changed over to cooling function. That is the inside thermostat control circuit 58 will be switched to make on rise of temperature, and the changeover shutters will be moved to the cooling position. Then on a rise in the temperature of thermostat 58, it will call for cooling and through the control centre the high temperature compressor unit 2 will be started. The low temperature compressor unit 3 is normally not used in the cooling function and the high temperature compressor unit needs to run at only its lowest capacity unless there is a heavy heat load when it could be set to run at higher capacity.

In other respects the cooling function is similar to the heating function.

Modulating by thermostat

In the preceding descriptions of heating and cooling system operation, thermostat 58 has been used to shut off and start the compressor motors as required to regulate room temperature. However an alternative method would be to avoid the on-off cycling of the compressor motors by modulating the system capacity with thermostat 58 and allowing the compressors to run continuously. This could be done by having thermostat 58, when satisfied (on rise of room temperature in heat pump function and on drop of temperature on cooling function), to switch in extra windings in detector coil 26 (FIG. 1).

This switching would effect a large capacity reduction. Then, later, when the thermostat 58 called for heating (or cooling) again, it would do so by switching these extra windings out of the circuit and the full capacity of the stage in use would be resumed. A capacity reduction would occur when the extra windings of 26 were switched in, because they would tend to cause an increase in the total voltage induced in the detector. The control system would respond by slowing the motors down to a speed at which the voltage in the detector would be the same as it had been before the extra windings were switched in, thus reducing system capacity proportionally regardless of which stage of heating or cooling was in use. With this method of modulation by thermostat 58 the capacity controller 24 is still used to select the appropriate stage of capacity but thermostat 58 overrides this control by controller 24 and reduces system capacity as it is satisfied, rather than shut down the motors. Other methods would be to switch shunt or series resistances in coil 26 circuit instead of extra windings in coil 26.

A second stage in thermostat 58 would turn off and start the motors as required when the capacity variation was insufficient to control room temperature.

Extra stages of this modulation by thermostat 58 could be used, or a continuous range of modulation used, rather than stages.

Inside thermostat system control

A simplification of the system control would be to combine the functions of controller 24 and thermostat 58 into a single instrument. That is, controller 24 would still control the system through a range of capacities and control the heating/cooling changeover. But the bulb of this controller would not be placed outside, but inside, so that the controller would be sensitive to room temperature. Its range of operation or separation between stages would be as small as possible so that the cut in points would be in the nature of: 71.5° F., 72° F., 72.5° F., 73° F. (for stages S1, S2, S3, S4). In this way controller 24 would act as a thermostat and control room temperature by reducing system capacity as it was satisfied, and increasing it on demand. With this method of control there should be at least two stages of control in cooling operation so that the compressor would not be continually stopping as the desired room temperature was reached. Around, and at, the desired room temperature the controller would have a null stage at which the compressor would be stopped. A typical range of control stages is shown in FIG. 5 and illustrated as S1(A), S2(A), S3(A), etc. An alternate method would be to have the range of control of controller 24 continuous rather than in stages.

Motor cooling

Figure 9:
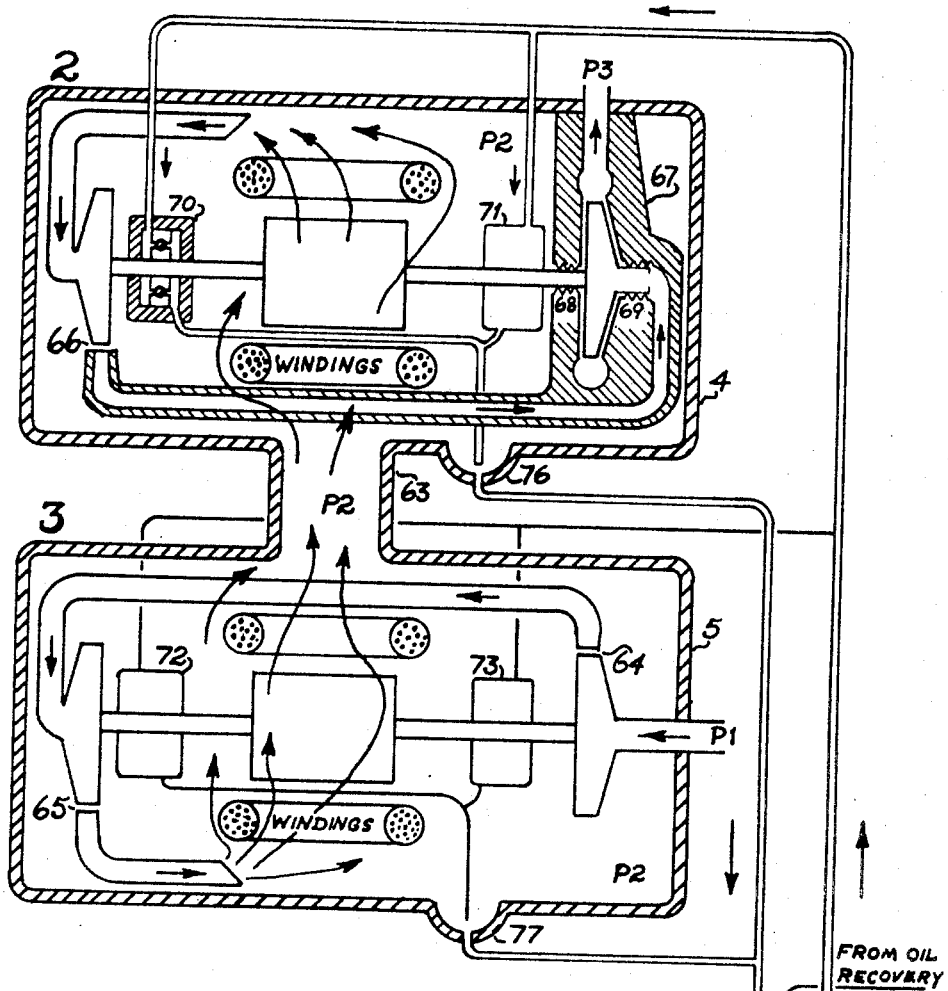
FIG. 9 is a schematic diagram of the compressor units and lubrication system.

FIG. 9 shows particularly, refinements in the compressor units, their semihermetic enclosures, the shaft bearing housings, the lubrication system and the pressures encountered at various parts of the system. Also it shows the path taken by the refrigerant vapor relative to the motor windings for the cooling of these same.

The enclosures 4, 5 are connected by transfer pipe 63 which is of ample size so that the pressure throughout both enclosures is equalized and this pressure is designated P2. The four stages of compression are shown 64, 65, 66, 67 and the pressures within these stages vary from suction pressure P1 to head pressure P3. The transfer of refrigerant vapor from stage 65 to 66 is done by discharging it from stage 65 into enclosure 5 in such a way that it flows over the motor windings of unit 3, then through transfer pipe 63 over the motor windings of unit 2 and into the intake of stage 66. Thus P2 will be the interstage pressure between 65 and 66. The labyrinth seals 68 and 69 are indicated on the shaft and intake of the impeller in stage 67. Each stage has such seals.

Lubrication system

The four compressor bearings 70, 71, 72, 73 are each enclosed in a housing, as shown at 70, which has close fitting openings for the motor shaft so that lubricating oil around the bearing tends to stay within the housing rather than flow outwards from the bearing along the shaft. These close fitting openings have spiral grooves in their bore which tend to keep the oil within the enclosure. The oil pump 74 pumps the oil from reservoir 75 into the housing of each bearing. The oil then drains into the sumps 76, 77 at the bottom of enclosures 4, 5. Any leakage oil from the bearing housing shaft openings also collects in these sumps. Sumps 76, 77 drain back into oil reservoir 75 whose pressure is also at P2. The oil pump, 74 is electrically powered.

Oil recovery

Since the present invention may be used at shaft speeds of 30,000 r.p.m. and higher, shaft seals at the bearings, of the direct contact type, are considered to be impractical. So then the lubrication oil will not be positively isolated from the refrigerant. Also, the flooded evaporator 32 tends to trap any oil which finds its way into it.

So an oil recovery system is provided. When the oil level in reservoir 75 (FIG. 1) drops below a certain level, float switch 78 activates the oil recovery cycle. A sequence timer controls this cycle. Regardless of whether the system is in heating or cooling function, any oil which is in the refrigerant circuit collects in the flooded evaporator 32. Since the refrigerant is continually boiling off, it will always leave this oil in the evaporator. So then the first step in recovery, is to pump down the evaporator. This is done by interrupting the electrical circuit to the solenoid valve 35 but keeping the compressor running continuously. This causes the liquid to keep boiling off in the evaporator but there is no flow of liquid refrigerant into the evaporator to replace it. This operation is maintained for a preset time which is sufficient to boil off most of the liquid in the evaporator. At this point the changeover shutters are reversed but the compressors allowed to continue running. Then the evaporator 32 becomes warmer than before, and the condenser 36, cooler. This will usually be the case in both heating and cooling operation. This changeover hastens the pump-down operation by causing a greater flow through the compressor and then prevents condensing back, or migration, in the evaporator when the compressor is stopped, since the evaporator will then usually be warmer than the condenser. After a short time the compressor is stopped and the pressures will equalize throughout the system and the separated oil will be lying at the bottom of the evaporator. Then the solenoid 79 is opened, and this oil will drain back to the oil reservoir 75 through line 80. The solenoid 79 is left open long enough to drain the oil back. Then the oil separation cycle is terminated. Solenoid 79 is closed. The circuit of solenoid 35 is reenergized. The changeover shutters are reversed and the compressor restarted.

In cases where the outside temperature was considerably below 73 degrees but the system was being made to run in cooling function (due to heavy inside heat load), the changeover shutter system would not be reversed during pump-down. However, this is a special case and involves other precautions which we will not expand on, for the sake of simplicity.

The fluid capacity of coil 36 is a little greater than the fluid capacity of evaporator 32 so that when 32 is pumped down the liquid refrigerant can be accommodated in coil 36.

Two stage compressor operation

FIG. 2 shows a version of the invention with a single two stage compressor. This system is similar to the four stage version with a few exceptions. The capacity controller has fewer stages of heating. The motor cooling is achieved by passing the transfer vapor between the two stages, over the motor. There is only one frequency converter and one motor.

Water to water system

Figure 10:
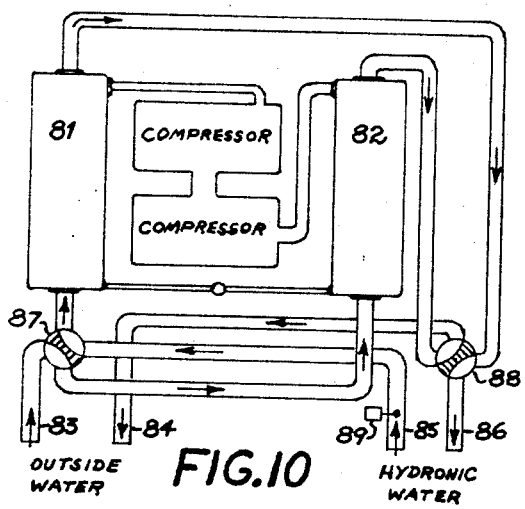
FIG. 10 shows a method of using this invention as a water to water system.

FIG. 10 shows an arrangement of the invention for using it as a water to water system. The condenser 81 and evaporator 82 in this arrangement are water contacted. Pipes 83 and 84 connect to the outside water, which might be from ground coils, well water, streams, lakes, sea, water tower or any other source. Pipes 85 and 86 connect into a hydronic circulating system.

In heating operation the outside water flows through evaporator 82 and the inside water circulates through condenser 81. FIG. 10 shows changeover valves 87 and 88 in the heating position.

For cooling operation four way changeover valves 87 and 88 reverse, and the outside water flows through condenser 81 and the inside water circulates through evaporator 82.

In other respects the arrangement would be similar to the invention as already described. However there would of course be no shutter system, defrost system, fans, etc. The bulb of capacity controller 24 would still need to be mounted in the outside air. Thermostat 58 is replaced by aquastat 89 mounted in the return water line 85. Aquastat 89 operates at two main temperature levels; about 40° F. in cooling (chiller) operation, and about 150° F. in heating (hot water) operation. Selection of the appropriate level is accomplished at changeover.

A possible alternative is that aquastat 89 could have a number of stages of control (or have a continuous range of control), and control system capacity by one of the various methods already described for the air to air system. A typical set of capacity stages (controlled by aquastat 89) is shown in FIG. 5 and designated S1(B), S2(B), S3(B), etc.

Servo operated changeover valves could be used and controlled by the controller 24 (or by a thermostat at room temperature) or the system could be manually changed over. A two stage or four stage compressor system could be used.

Cooling only

This invention may be used for cooling only. That is, without heat pump operation. A single motor, two stage compressor as shown in FIG. 2 would usually be used. In this application the changeover shutters (FIGS. 6, 7, 8) or the changeover water valves (FIG. 10) would not be used. In the oil recovery cycle, the changeover step is then omitted. In this case oil reservoir 75 would be of a larger size and have an electric heating element 90 (FIG. 1), so that if (during oil recovery) liquid refrigerant drained back with the oil (as a result of refrigerant migration), it could be accommodated by the extra capacity of reservoir 75 and slowly boiled off by heater 90 during system operation.

With this "cooling only" arrangement it would also be possible to use water to air, and air to water combinations, as well as the air to air and water to water systems. That is, the system could have a water cooled condenser and air-contacted evaporator, or, it could have an air cooled condenser and water contacted evaporator (air cooled chiller system).

A number of stages of capacity variation could be provided by methods similar to those already described for heat pump capacity variation (see FIG. 5, S9, S10, S11, S12). Selection of these stages, however, would be done directly by thermostat 58 (or aquastat 89), which could be multistaged. Thermostat 58 at room temperature would thus take the place of controller 24 and the range over which it would vary the capacity of the system would be as small as practicable, (2° F. or less). For example, with the thermostat set at 73° F., and with inside temperature above 74.5° F. the system would be at full capacity (stage S12, 10 horsepower). As the room temperature dropped to 74.5° F., one stage of the thermostat would be satisfied and the system would be in stage S11 (6 horsepower). At 74° F., it would be in stage S10 (3 horsepower) and at 73.5° F., in stage S9 (1 horsepower). If the room temperature dropped to 73° F. the thermostat would be completely satisfied and the compressor stopped. If the system were used as a water chiller, aquastat 89 would take the place of thermostat 58 and be used similarly (though at lower temperatures).

An alternative arrangement would be to have thermostat 58 or aquastat 89 operate over a continuous range rather than in stages.

Surge control

In this invention, when the capacity of the compressor system is reduced substantially (by reduction of rotation speed), difficulty is encountered with surging of the compressor. This applies particularly to the lowest capacity stages S4(A), S6(A), S4(B), S5(B), S9 (as shown in FIG. 5). In these stages the low pressure compressor unit 3 is not running. The surge point of compressor unit 2 can be lowered by causing the refrigerant vapor to flow through the inactive unit 3 and not through bypass valve 1. This causes a restriction on vapor flow at unit 3, which reduces the tendency to surge.

Bypass valve 1 could be dispensed with, in the application shown by FIG. 5, stages S1(B) through S6(B). But in the application shown with stages S1(A) through S7(A) the bypass would be needed in stage S7(A). This bypass flow could then be provided by substituting butterfly valve 1 for checkvalve 1 (see FIG. 1) in the bypass circuit. Valve 91 would be closed in all stages except S7(A) when it would be open. Valve 91 would be electrically actuated. A possible alternative might be that valve 91 modulate bypass flow over a range of various steps or over a continuous range (rather than only the open or closed settings). This would provide a method of controlling surging of compressor unit 2 under various conditions (and in various stages of capacity) when compressor unit 3 is shut down.

With the two stage compressor system shown in FIG. 2, conventional suction line dampers or inlet guide vanes 92 can be used, as required, to control surging at low capacities.

Variable capacity evaporator

With this invention there are advantages in reducing the capacity of the evaporator itself at the times when the system is operating at reduced capacity. This can be done by lowering the operating level of liquid refrigerant in the evaporator. An extra float switch 93 (FIG. 1) maintains the liquid at this reduced level.

When the liquid level is lowered the major part of cooling effect (or heat transfer) takes place below the liquid line. That is, the cooling effect is concentrated in the portion of the evaporator which is flooded. Also this means that the flooded portion of the evaporator is considerably colder than the whole evaporator would be, if entirely flooded; assuming of course the same reduced system capacity in both cases. That is important in cooling operation since the cooler evaporator (or portion of the evaporator), is needed to remove moisture from the air for humidity control. Reduced evaporator capacity also helps prevent compressor surging at low system capacities.

There could be more than one additional float switch used in the manner of switch 93, so that a number of different levels might be maintained as required.

Arrangement of components

Figure 11:
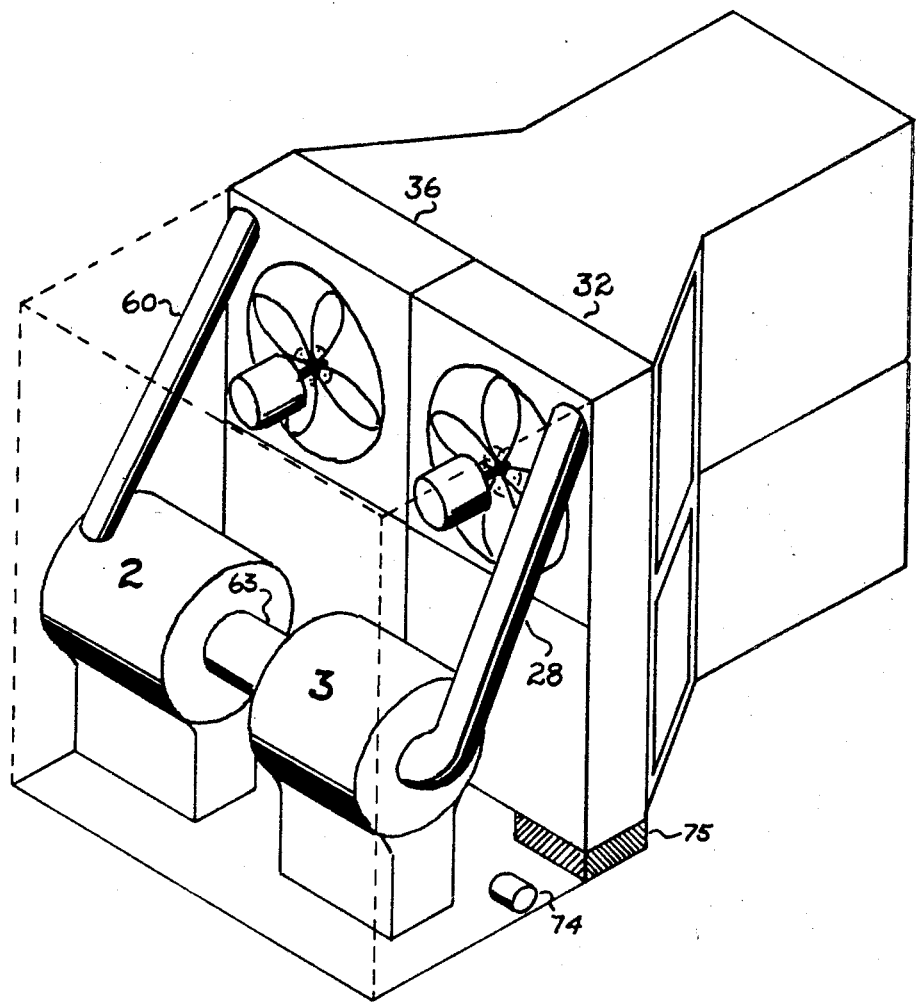
FIG. 11 shows a typical arrangement of component parts.

In the drawings, FIGS. 1, 2, 3, 4, 9 and 10 the various components of this invention have been shown schematically. However FIG. 11 and to some extent FIGS. 6, 7, 8 show a suitable arrangement of components in their positions relative to each other. The compressor units have previously been shown in side by side arrangement but they might also be placed in tandem arrangement as shown in FIG. 11. The interconnection of their enclosures would then be achieved at the ends rather than the sides. Or, of course a single compressor enclosure could be used. However the vapor transferring from the second stage of unit 3 must still pass over the windings of both motors on its way to the first stage of unit 2 (for the purpose of motor cooling).

The evaporator 32 and condensor 36 are shown standing upright, side by side, and the oil reservoir 75 and oil pump 74 are at a level lower than the bottom of the evaporator and the bottom of the compressors. This is so that oil might drain from these components into the oil reservoir.

We claim:

1. In combination, a heat pump and air conditioning system comprising multi-stage centrifugal compressors driven with variable speed electric motor machinery to pump refrigerant vapor from an evaporator to a condenser, means for varying the speed of the electric motor machinery, temperature sensing means for selecting the operating capacity load on the motor machinery and the system, and a current (load) sensing means for varying the speed of the motor machinery toward maintaining the load called for by the temperature sensing means.

2. Claim 1 and the said means for varying the speed of the electric motor machinery consisting of a variable frequency power supply.

3. Claim 2 and the said variable frequency power supply consisting of solid state devices.

4. Claim 3 and the said temperature sensing and the load sensing devices operating to control or vary the frequency of the solid state power supply.

5. Claim 1 and the multi stage centrifugal compressors consisting of two, two stage centrifugal compressors, each two stage pair being driven by a variable speed induction motor.

6. Claim 1 and means associated with the temperature sensing means for converting the system to or from either a heat pump or air conditioning system.

7. Claim 5 and means for shutting down the first two stages of compression, as required for capacity reduction.

8. Claim 5 and the flow of the refrigerant between the first two and the second two stages of compression providing the ambient pressure within the compressors and the flow of the refrigerant being directed across the induction motors to provide cooling action for them.

9. Claim 1 and means for periodically deicing the evaporator.

10. An equipment as set forth in claim 6 and the conversion means for converting from a heat pump to an air conditioning system or vice versa consisting of an air duct leading to a distribution system, a return air duct, a housing assembly, providing connecting passages between the said condensor and evaporator and the distribution air ducts, air directing shutters located in the housing, the said air directing shutters being adapted to direct the air flow from outside the system through the condenser and back to the outside, while at the same time directing the air from the return duct of the distribution system through the evaporator and back into the discharge air duct of the distribution system, thus providing a cooling system, and means for moving the air shutter to direct outside air through the evaporator and back to the outside, while at the same time causing the air from the return air duct of the distribution system to flow through the condenser and back into the discharge duct of the distribution system, thus providing a heating system.

11. Claim 10 and the said air directing shutters being mounted in pairs on two shafts, the two shafts being linked together for simple manual or servo operation to change the system from heating to cooling or vice versa, and to defrost the evaporator coils.

12. Claim 1 and oil recovery means for separating the oil from the refrigerant.

13. Claim 1 and means for limiting the starting power drain on the electrical supply line, the said means including a resistance inserted in the circuit for a predetermined time during the starting of the induction motors and centrifugal compressors.

14. Claim 1 and means providing a variable capacity evaporator, the said means controlling the amount of liquid maintained in the evaporator.

15. Claim 1, and a room thermostat, the said thermostat operating with the said load sensing means to reduce the load on the system an the room temperature approaches the setting of the thermostat.

16. Claim 7 and a means for controlling compressor surging when the two operating stages are operating at low capacity.

17. Claim 1 and the multistage centrifugal compressors consisting of two stages of compression driven by one variable speed induction motor.

References Cited
UNITED STATES PATENTS

| | | | |
|---|---|---|---|
| 2,718,119 | 9/1955 | Prince | 62—159 |
| 2,786,334 | 3/1957 | Wolf | 62—230 |
| 2,963,878 | 12/1960 | Beggs | 62—505 |
| 2,964,923 | 12/1960 | Cone | 62—230 |
| 3,094,850 | 6/1963 | Newton | 62—230 |
| 3,143,864 | 8/1964 | Sebordine | 62—159 |
| 3,163,999 | 1/1965 | Sitzler | 62—505 |
| 3,218,825 | 11/1965 | McClure | 62—505 |
| 3,378,062 | 4/1968 | Ringquist | 62—159 |
| 3,280,576 | 10/1966 | Endress | 62—84 |

WILLIAM J. WYE, *Primary Examiner.*

U.S. Cl. X.R.

62—151, 192, 208, 230, 505, 510